(12) United States Patent
Ly et al.

(10) Patent No.: US 12,335,863 B2
(45) Date of Patent: Jun. 17, 2025

(54) UPLINK TRANSMISSION DURING A CELL SLEEP MODE OPERATION

(71) Applicant: QUALCOMM Incorporated, San Diego, CA (US)

(72) Inventors: Hung Dinh Ly, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/659,439

(22) Filed: Apr. 15, 2022

(65) Prior Publication Data

US 2023/0337130 A1 Oct. 19, 2023

(51) Int. Cl.
*H04W 72/23* (2023.01)
*H04W 52/02* (2009.01)
*H04W 72/1268* (2023.01)
*H04W 72/566* (2023.01)

(52) U.S. Cl.
CPC ... *H04W 52/0203* (2013.01); *H04W 72/1268* (2013.01); *H04W 72/23* (2023.01); *H04W 72/566* (2023.01)

(58) Field of Classification Search
CPC .................................................. H04W 52/0203
USPC ....................................................... 455/452.1
See application file for complete search history.

(56) References Cited

U.S. PATENT DOCUMENTS

| | | | |
|---|---|---|---|
| 2021/0352583 A1* | 11/2021 | Babaei | H04W 52/0229 |
| 2021/0360583 A1* | 11/2021 | Sadeghi | H04W 72/23 |
| 2022/0046522 A1* | 2/2022 | Kim | H04W 52/365 |

OTHER PUBLICATIONS

International Search Report and Written Opinion—PCT/US2023/015862—ISA/EPO—Jun. 21, 2023.

* cited by examiner

*Primary Examiner* — Qutbuddin Ghulamali
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a configuration of uplink resources associated with a cell. The UE may receive an indication that the cell is in a sleep mode, wherein at least a subset of the uplink resources occurs when the cell is in the sleep mode. The UE may transmit one or more communications based at least in part on the configuration of the uplink resources associated with the cell and the indication that the cell is in the sleep mode. Numerous other aspects are described.

28 Claims, 9 Drawing Sheets

UPLINK TRANSMISSION DURING A CELL SLEEP MODE OPERATION

FIELD OF THE DISCLOSURE

Aspects of the present disclosure generally relate to wireless communication and to techniques and apparatuses for uplink transmission during a cell sleep mode operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of uplink resources associated with a cell. The method may include receiving an indication that the cell is in a sleep mode, wherein at least a subset of the uplink resources occurs when the cell is in the sleep mode. The method may include transmitting one or more communications based at least in part on the configuration of the uplink resources associated with the cell and the indication that the cell is in the sleep mode.

Some aspects described herein relate to a method of wireless communication performed by a network entity. The method may include transmitting, to a UE, a configuration of uplink resources associated with a cell. The method may include transmitting, to the UE, an indication that the cell is in a sleep mode, wherein at least a subset of the uplink resources occurs when the cell is in the sleep mode. The method may include receiving, from the UE, one or more communications based at least in part on the configuration of the uplink resources associated with the cell and the indication that the cell is in the sleep mode.

Some aspects described herein relate to an apparatus for wireless communication at a UE. The apparatus may include a memory and one or more processors coupled to the memory. The one or more processors may be configured to receive, from a network entity, a configuration of uplink resources associated with a cell. The one or more processors may be configured to receive an indication that the cell is in a sleep mode, wherein at least a subset of the uplink resources occurs when the cell is in the sleep mode. The one or more processors may be configured to transmit one or more communications based at least in part on the configuration of the uplink resources associated with the cell and the indication that the cell is in the sleep mode.

Some aspects described herein relate to an apparatus for wireless communication at a network entity. The apparatus may include a memory and one or more processors coupled to the memory. The one or more processors may be configured to transmit, to a UE, a configuration of uplink resources associated with a cell. The one or more processors may be configured to transmit, to the UE, an indication that the cell is in a sleep mode, wherein at least a subset of the uplink resources occurs when the cell is in the sleep mode. The one or more processors may be configured to receive, from the UE, one or more communications based at least in part on the configuration of the uplink resources associated with the cell and the indication that the cell is in the sleep mode.

Some aspects described herein relate to a non-transitory computer-readable medium that stores a set of instructions for wireless communication by a UE. The set of instructions, when executed by one or more processors of the UE, may cause the UE to receive, from a network entity, a configuration of uplink resources associated with a cell. The set of instructions, when executed by one or more processors of the UE, may cause the UE to receive an indication that the cell is in a sleep mode, wherein at least a subset of the uplink resources occurs when the cell is in the sleep mode. The set of instructions, when executed by one or more processors of the UE, may cause the UE to transmit one or more communications based at least in part on the configuration of the uplink resources associated with the cell and the indication that the cell is in the sleep mode.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of uplink resources associated with a cell. The set of instructions, when executed by one or more processors of the network entity, may cause the network entity to transmit, to the UE, an indication that the cell is in a sleep mode, wherein at least a subset of the uplink resources occurs when the cell is in the sleep mode. The set of instructions, when executed by one or more processors of the network entity, may cause the network entity to receive, from the UE, one or more communications based at least in part on the configuration of the uplink resources associated with the cell and the indication that the cell is in the sleep mode.

Some aspects described herein relate to an apparatus for wireless communication. The apparatus may include means for receiving, from a network entity, a configuration of uplink resources associated with a cell. The apparatus may include means for receiving an indication that the cell is in a sleep mode, wherein at least a subset of the uplink resources occurs when the cell is in the sleep mode. The apparatus may include means for transmitting one or more communications based at least in part on the configuration of the uplink resources associated with the cell and the indication that the cell is in the sleep mode.

Some aspects described herein relate to an apparatus for wireless communication. The apparatus may include means for transmitting, to a UE, a configuration of uplink resources associated with a cell. The apparatus may include means for transmitting, to the UE, an indication that the cell is in a sleep mode, wherein at least a subset of the uplink resources occurs when the cell is in the sleep mode. The apparatus may include means for receiving, from the UE, one or more communications based at least in part on the configuration of the uplink resources associated with the cell and the indication that the cell is in the sleep mode.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
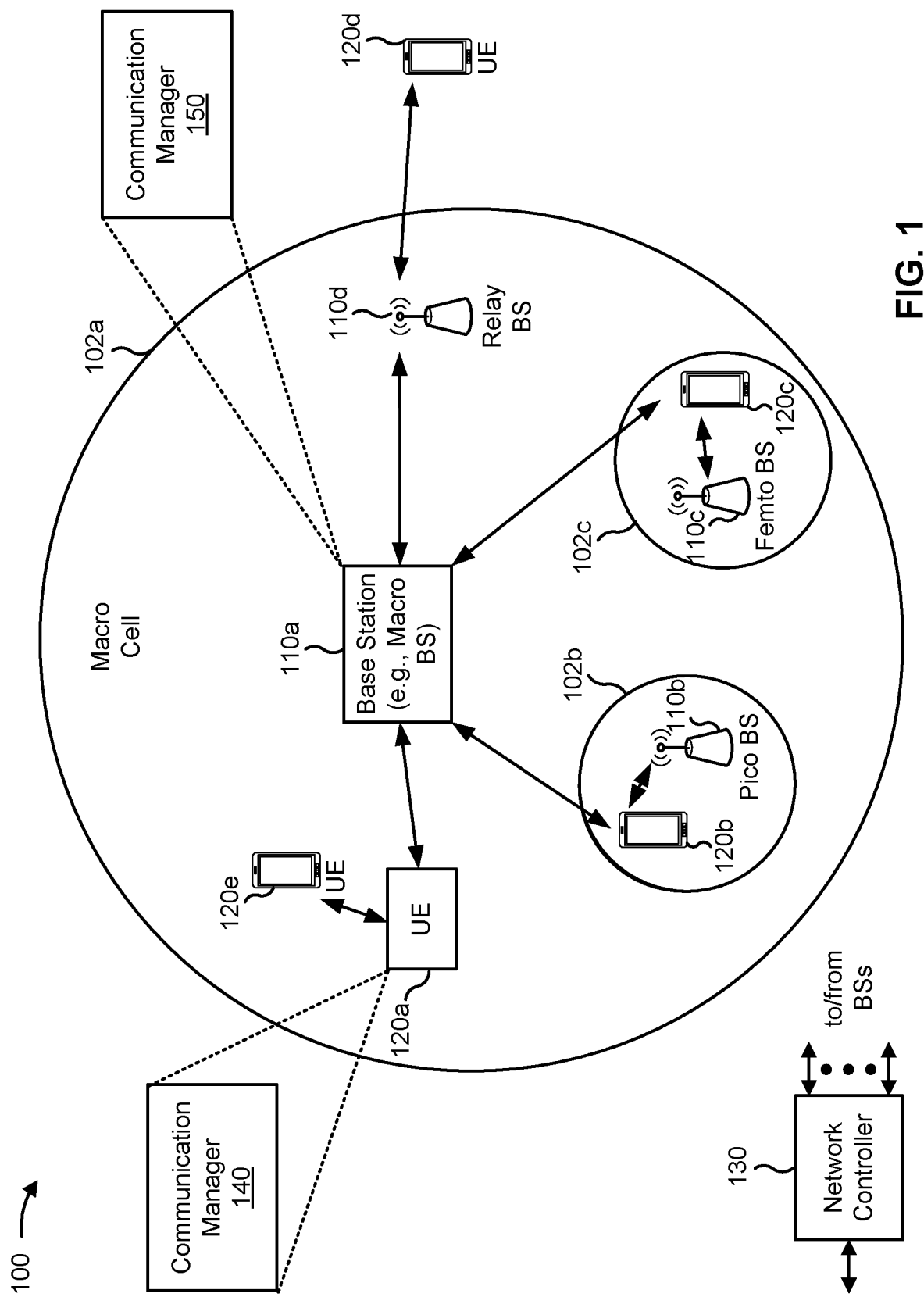
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated, such as according to an open radio access network (O-RAN) architecture, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of uplink resources associated with a cell; receive an indication that the cell is in a sleep mode, wherein at least a subset of the uplink resources occurs when the cell is in the sleep mode; and transmit one or more communications based at least in part on the configuration of the uplink resources associated with the cell and the indication that the cell is in the sleep mode. Additionally, or alternatively, the communication manager 140 may perform one or more other operations described herein.

In some aspects, the network entity described herein may correspond to the base station 110. In such aspects, the network entity may include a communication manager 150. As described in more detail elsewhere herein, the communication manager 150 may transmit, to a UE, a configuration of uplink resources associated with a cell; transmit, to the UE, an indication that the cell is in a sleep mode, wherein at least a subset of the uplink resources occurs when the cell is in the sleep mode; and receive, from the UE, one or more communications based at least in part on the configuration of the uplink resources associated with the cell and the indication that the cell is in the sleep mode. Additionally, or alternatively, the communication manager 150 may perform one or more other operations described herein.

As indicated above, FIG. 1 is provided as an example. Other examples may differ from what is described with regard to FIG. 1.

Figure 2:
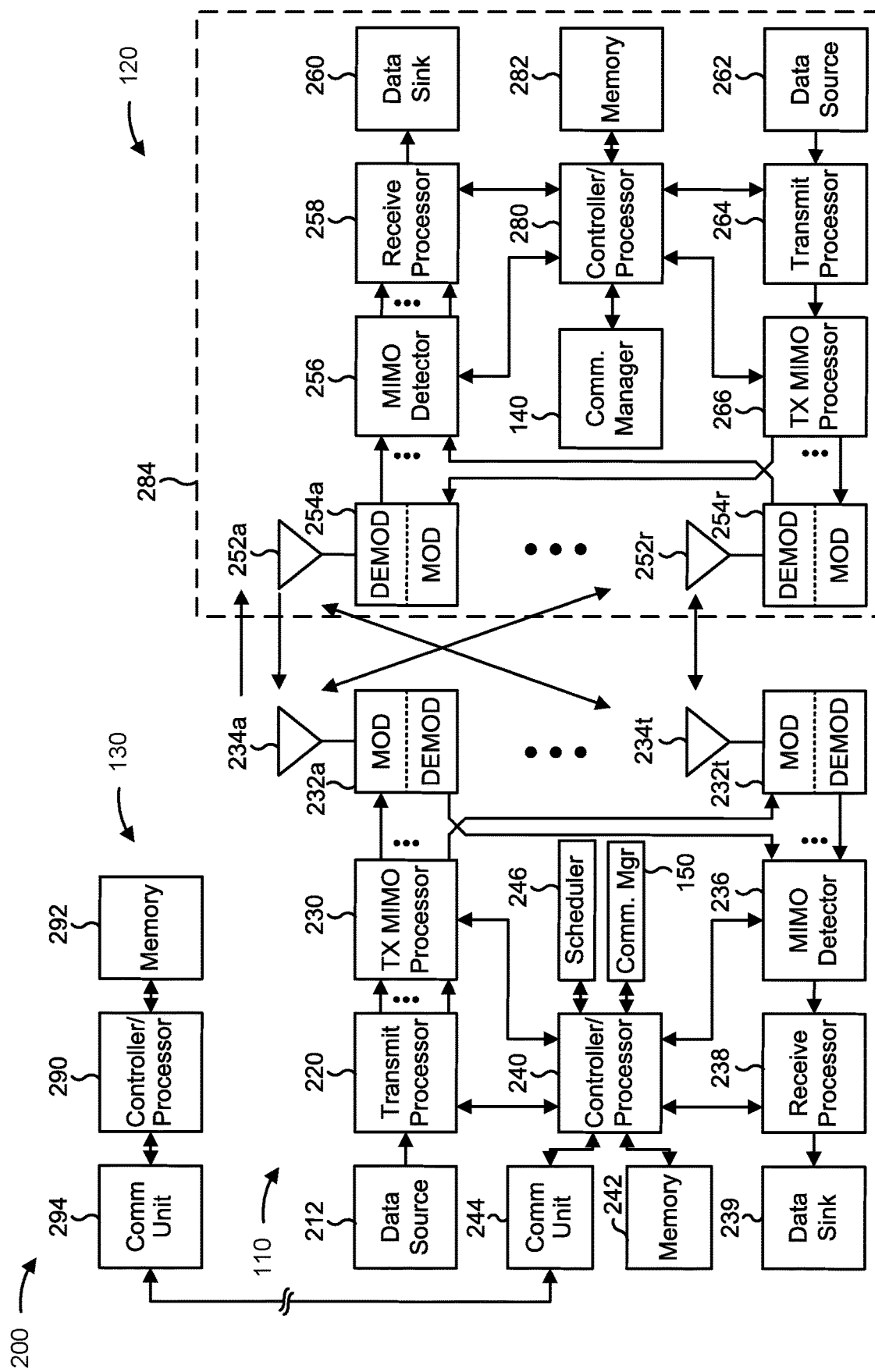
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

Figure 6:
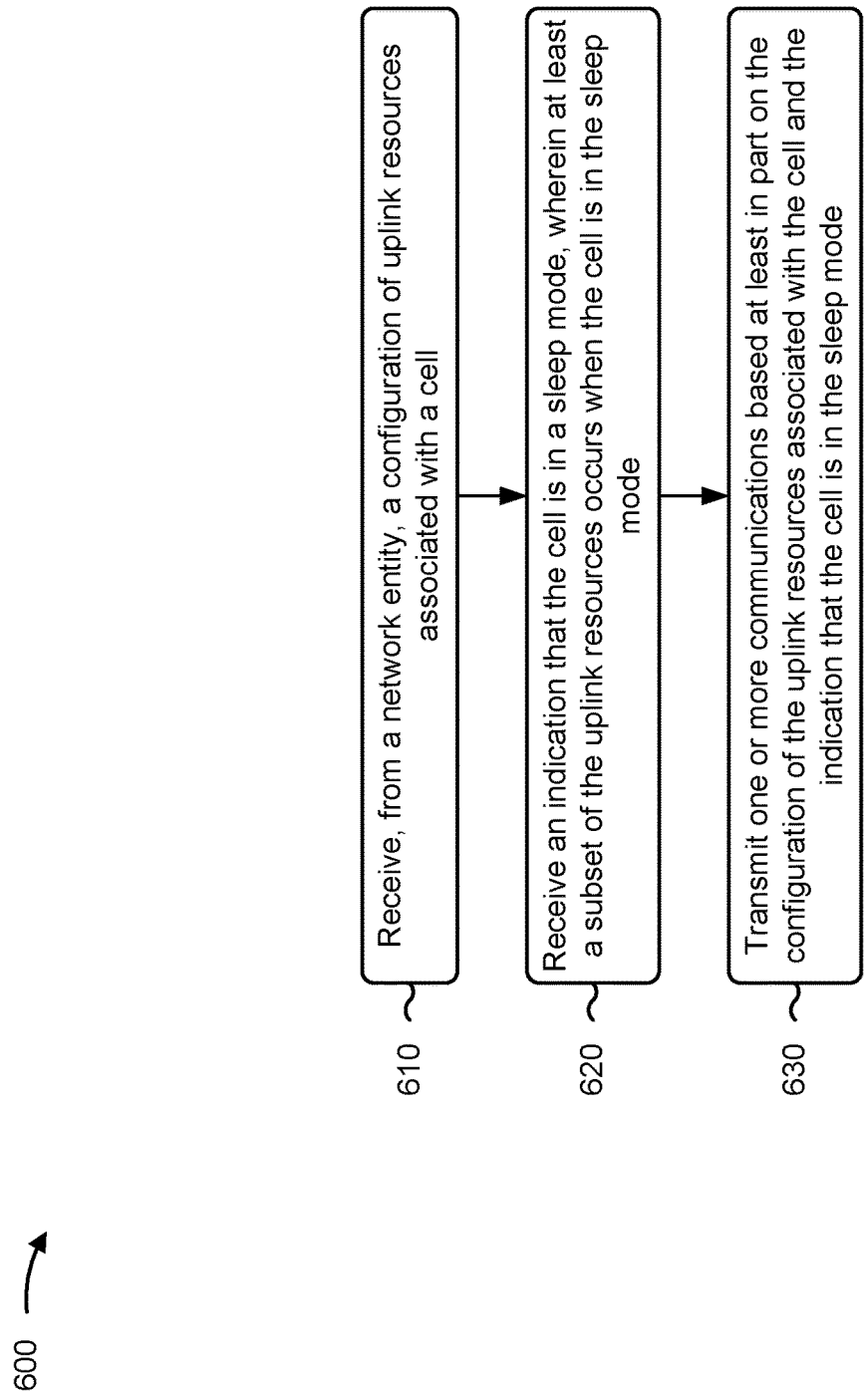
FIG. 6 is a diagram illustrating an example process performed, for example, by a UE, in accordance with the present disclosure.
Figure 7:
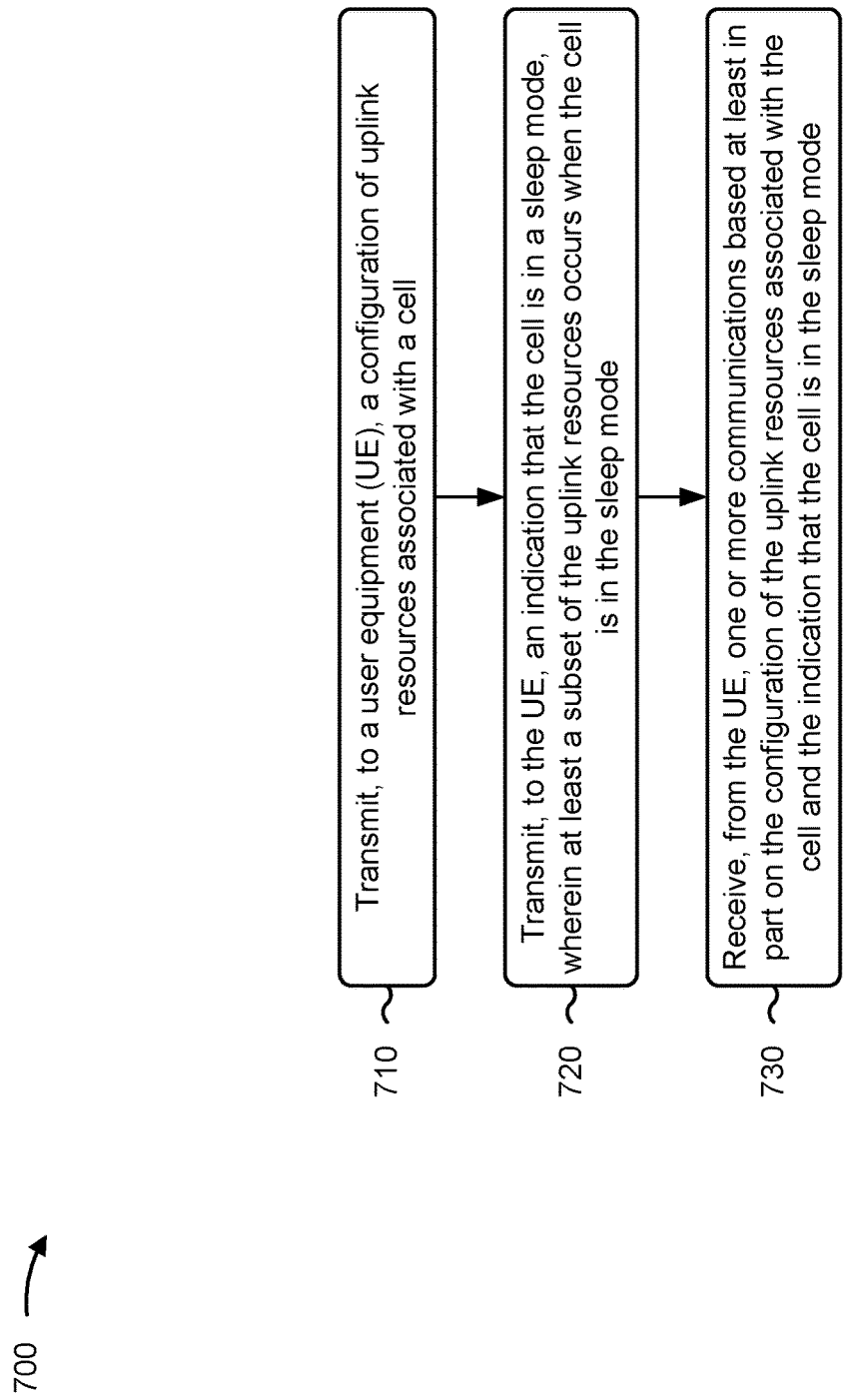
FIG. 7 is a diagram illustrating an example process performed, for example, by a network entity, in accordance with the present disclosure.

The controller/processor 240 of the base station 110, the controller/processor 280 of the UE 120, and/or any other component(s) of FIG. 2 may perform one or more techniques associated with uplink transmission during a cell sleep mode operation, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting)

by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of uplink resources associated with a cell; means for receiving an indication that the cell is in a sleep mode, wherein at least a subset of the uplink resources occurs when the cell is in the sleep mode; and/or means for transmitting one or more communications based at least in part on the configuration of the uplink resources associated with the cell and the indication that the cell is in the sleep mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity described elsewhere herein includes means for transmitting, to a UE, a configuration of uplink resources associated with a cell; means for transmitting, to the UE, an indication that the cell is in a sleep mode, wherein at least a subset of the uplink resources occurs when the cell is in the sleep mode; and/or means for receiving, from the UE, one or more communications based at least in part on the configuration of the uplink resources associated with the cell and the indication that the cell is in the sleep mode. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
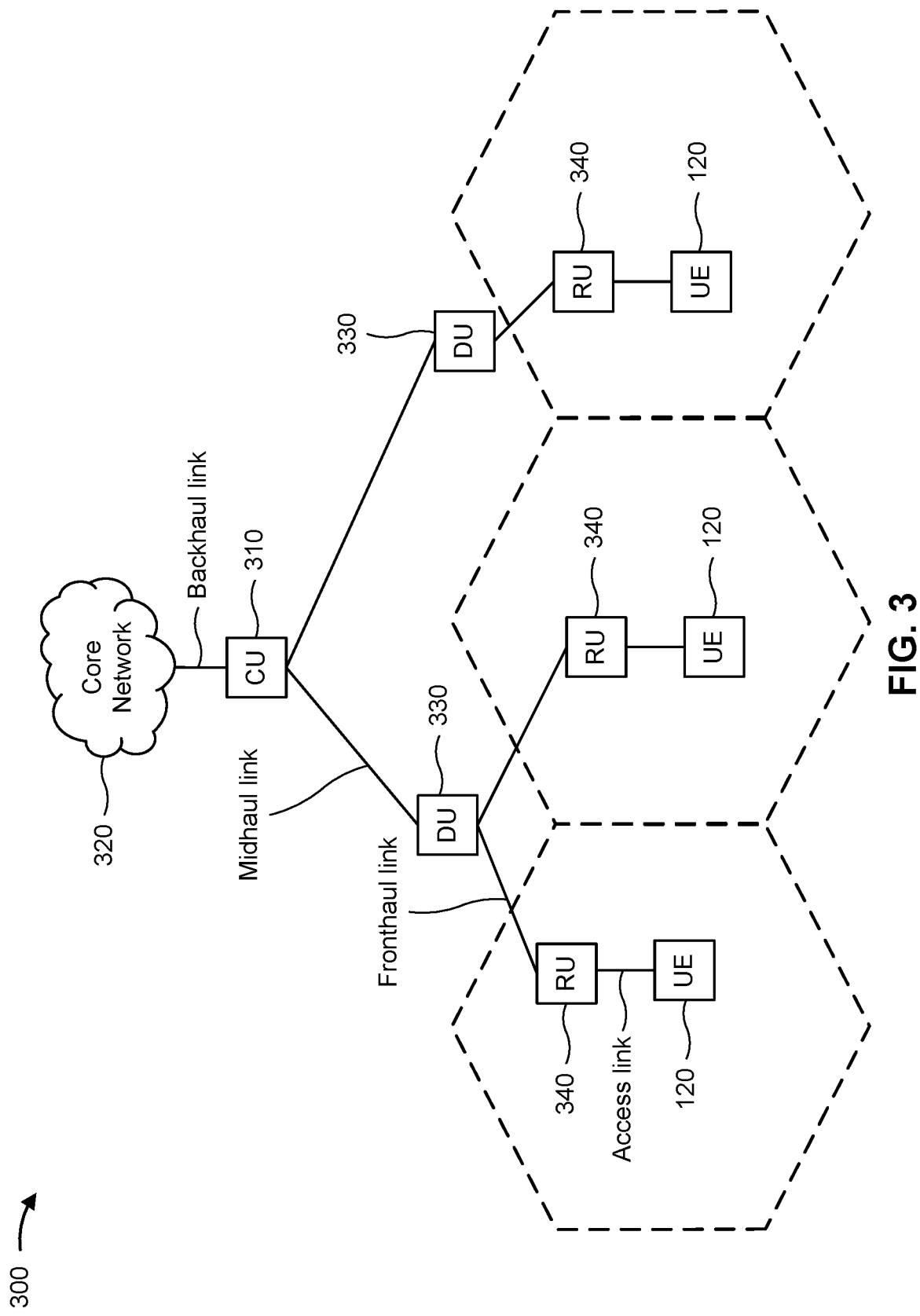
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
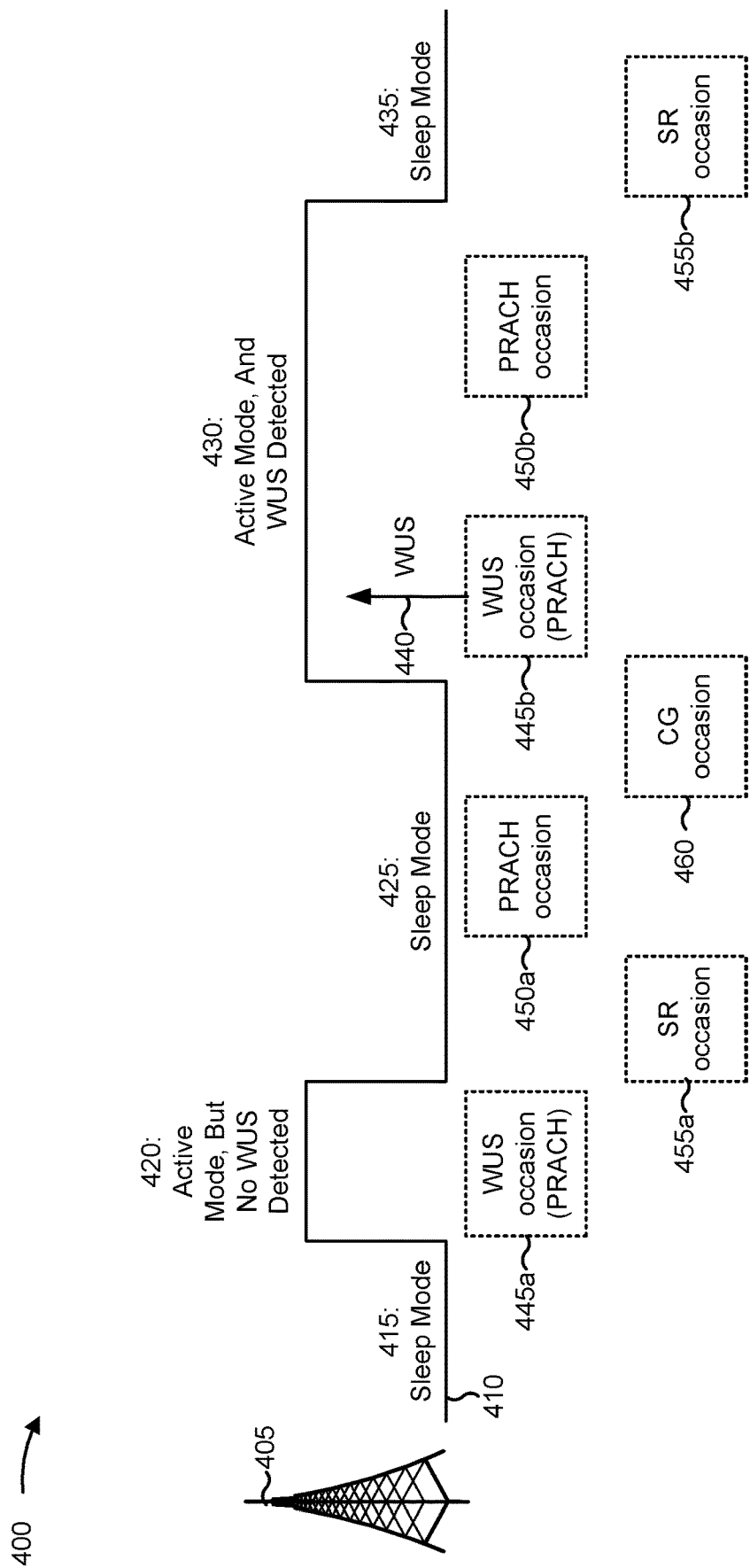
FIG. 4 is a diagram illustrating an example of a cell operating in an active mode and a sleep mode, in accordance with the present disclosure.

FIG. 4 is a diagram illustrating an example 400 of a cell operating in an active mode and a sleep mode, in accordance with the present disclosure. The cell may be a macro cell (e.g., macro cell 102a), a pico cell (e.g., pico cell 102b), a femto cell (e.g., femto cell 102c), and/or another type of cell. Moreover, the cell may be associated with a network entity 405, which may correspond to any of the network entities described herein, such as a base station 110, a CU 310, a DU 330, an RU 340, or a similar network entity.

An NR network may consume a great amount of electrical power, with base stations or similar network entities of the NR network consuming more than 20% of the power. A base station or similar network entity of the NR network may include multiple active antenna units (AAUs) to support NR communications, and the AAUs may consume 90% of the power used by the NR base station. An NR base station or similar network entity may consume more than 3 times the power consumed by an LTE base station, because the NR base station or similar network entity may operate in a higher band, over a larger bandwidth, and with more TRPs. High power consumption involves high operating expenses that reduce operator profits. Furthermore, high power consumption may impact the environment because electricity generation may increase carbon emissions.

In some aspects, the NR network may optimize power consumption as part of a green NR network. An NR network entity of the NR network (e.g., network entity 405), or at least a portion of the AAU of the network entity 405, may thus sleep or wake up as needed in order to conserve resources. For example, the network entity 405 may use 0-8 antenna ports, rather than 64 antenna ports, from midnight to 3:00 AM. To further reduce power, the network entity 405 may transmit synchronization signal blocks (SSBs) every 160 milliseconds (ms) rather than every 20 ms, or the like. The network entity 405 conserves power in sleep mode, and a cell associated with the network entity 405 in a sleep mode may be referred to as a "dormant cell."

More particularly, as shown by the plot line indicated by reference number 410, the network entity 405 and/or the cell associated with the network entity 405 may alternatingly operate in a sleep mode and an active mode in an effort to reduce power consumption or the like. For example, the network entity 405 and/or the cell associated with the network entity 405 alternates between a first instance of the sleep mode 415, a first instance of the active mode 420, a second instance of the sleep mode 425, a second instance of the active mode 430, and a third instance of the sleep mode 435.

In some aspects, the network entity 405 may be a base station or similar network entity that provides a coverage cell (e.g., primary cell (PCell)), or controls one or more TRPs for transmitting SSB broadcasts or connecting UEs. In some aspects, the network entity 405 may be a network entity that provides a capacity boosting cell or controls capacity boosting TRPs (e.g., secondary cell (SCell)). A capacity boosting network entity may be in the sleep mode and may enter the active mode when needed. For example, the capacity boosting network entity may be employed at stadium events, where large numbers of UEs are congregating. The capacity boosting network entity may enter the sleep mode after the event ends.

The network entity 405 may be in the active mode when transmitting periodic SSB broadcasts (and other system information), when monitoring for PRACH messages from UEs in PRACH occasions, and when monitoring for small data transmissions (SDTs). If there are UEs that are to enter into a connected state or transmit an SDT, the network entity 405 may be expected to be in the active mode. Accordingly, the network entity 405 may wake up in response to a physical layer wake up signal (WUS) from the UE 120. The WUS for the network entity 405 may enable the network entity 405 to sleep to reduce network power consumption and to improve network energy efficiency. The WUS may also enable predicted sleep periods for the network entity 405. For example, as shown in FIG. 4, in order to transition the network entity 405 and/or the cell associated with the network entity 405 from a sleep mode to an active mode, one or more UEs (e.g., UE 120) may transmit a WUS 440 (sometimes referred to as a cell WUS (C-WUS)) in a configured WUS occasion 445a or 445b, which may be configured to occur during a time the network entity 405 is in the active mode. For example, a first WUS occasion 445a may be scheduled during the first instance of the active mode 420, and a second WUS occasion may be scheduled during the second instance of the active mode 430. If no WUS is detected by the network entity 405 during the WUS occasion, such as is the case during the first WUS occasion 445a in FIG. 4, the network entity 405 may reenter sleep mode after the WUS occasion has elapsed. However, if a WUS is detected by the network entity 405 during the WUS occasion, such the WUS 440 received during the second WUS occasion 445b in FIG. 4, the network entity 405 may remain in an active mode for a longer period of time in order to receive transmissions from the UE or the like. More particularly, as shown in FIG. 4, the second instance of the active mode 430 is longer in duration than the first instance of the active mode 420 such that the network entity 405 may receive a random access transmission, an SDT, or the like from a UE that transmitted the WUS 440.

In some aspects, the UE may transmit the WUS as a proactive signal, such as before a first step of a 4-step random access channel (RACH) procedure or a 2-step RACH procedure. The first step of the 4-step RACH procedure may include the UE transmitting a preamble (sometimes referred to as a random access preamble, a PRACH preamble, or a random access message (RAM) preamble), which may be referred to as a message 1, msg1, MSG1, a first message, or an initial message in a four-step RACH procedure. The first step of the 2-step RACH procedure may include the UE transmitting a RAM preamble and a RAM payload. The RAM preamble and the RAM payload may be referred to as message A, msgA, a first message, or an initial message in a 2-step RACH procedure. The WUS may be then considered a step 0 message of a RACH procedure. Accordingly, in some aspects, one or more of the WUS occasions 445a or 445b may be a configured PRACH occasion. Put another way, a PRACH of a RACH procedure may be used as a WUS occasion 445a or 445b. In some aspects, however, the network entity 405 may not enter an active mode during each PRACH occasion. For example, as shown in FIG. 4, PRACH occasion 450a occurs during the second instance of the sleep mode 425, and PRACH occasion 450b would have occurred during the third instance of the sleep mode 435 if the network entity had not received the WUS 440 and thus remained in the active mode, as described.

In some aspects, one or more UEs may be configured with periodic resource occasions for uplink transmissions that occur during a sleep mode of the network entity 405 and/or the cell associated with the network entity 405. For example, one or more PRACH occasions (e.g., PRACH occasion 450a) may occur during a sleep mode of the network entity 405 and/or the cell associated with the network entity 405, as described. A UE may need to utilize one or more of these PRACH occasions for transmitting a number of communications, such as for communications associated with: initial access after UE power up; transition from an RRC idle/active to an RRC connected state; RRC connection re-establishment after radio link failure; handover procedures; synchronization procedures (e.g., when uplink or downlink data arrives in RRC_CONNECTED with non-synchronized uplink); uplink data arrival in RRC_CONNECTED with no physical uplink control channel (PUCCH) resources allocated for a scheduling request (SR); SR Failure (e.g., when uplink data is available, but no uplink grant is given in response to a SR); on-demand system information; beam failure recovery; and/or establishing time alignment when adding an SCell (which may be triggered by a physical downlink control channel (PDCCH) order). Additionally, or alternatively, a UE may be configured with one or more SR occasions, such as SR occasion 455a that occurs during the second instance of the sleep mode 425, and an SR occasion 455b that occurs during the third instance of the sleep mode 435. The SR occasions 455a and 455b may be used by a UE for requesting resources for an uplink data transmission. Additionally, or alternatively, a UE may be configured with one or more configured grant (CG) occasions, such as CG occasion 460 (sometimes referred to a CG physical uplink shared channel (PUSCH) occasion), which occurs during the second instance of the sleep mode 425. The CG occasions 460 may be used by a UE for transmitting an uplink data transmission, or the like.

When a periodic resource occasion for uplink transmissions occurs during a sleep mode of the network entity 405 and/or the cell associated with the network entity 405, the network entity 405 may not be expecting an uplink transmission and/or may not be capable of receiving certain uplink transmissions due to the reduce antenna ports and/or resources being utilized during the sleep mode. Accordingly, a UE may not be able to utilize a periodic resource occasion for uplink transmissions occurs during the sleep mode and/or may not know whether it can utilize the periodic resource occasion for uplink transmissions occurs during the sleep mode. Accordingly, a UE may need to wait until a WUS occasion in order to transmit a WUS (such as the WUS 440 transmitted in the WUS occasion 445b) to wake up the cell before using a periodic uplink occasion (e.g., a PRACH occasion, an SR occasion, a CG occasion, or the like), introducing increased latency into the system. This may be particularly problematic for certain time-sensitive uplink transmissions, for which the delay caused by having to wait for the network entity 405 and/or the cell associated with the network entity 405 to enter the active mode may be too long for the time-sensitive application.

Some techniques and apparatuses described herein enable improved communications during a sleep mode of a network entity and/or a cell associated with the network entity, thereby reducing latency in the system, among other benefits. In some aspects, a UE (e.g., UE 120) may receive, from a network entity (e.g., network entity 405) a configuration of uplink resources associated with a cell and an indication that the cell is in a sleep mode, with at least a subset of the uplink resources occurring when the cell is in the sleep mode. Moreover, in some aspects, the UE may transmit one or more communications based at least in part on the configuration of the uplink resources associated with the cell and the indication that the cell is in the sleep mode. This may include transmitting certain uplink communications during the sleep mode, such as communications associated with a certain type of uplink communication (e.g., communications associated with an RRC re-establishment procedure, communications associated with an SR failure, communications associated with a beam failure recovery procedure, PRACH communications, or the like) and/or communications associated with a certain priority value. Moreover, in some aspects, the UE may receive, from the network entity, a configuration indicating whether the UE is permitted to transmit the one or more communications using the subset of the uplink resources occurring when the cell is in the sleep mode. In this way, the UE may beneficially transmit certain communications even when a network entity is operating in a sleep mode, thereby reducing latency associated with such communications and improving resource utilization and communication channels between the UE and the network entity.

As indicated above, FIG. 4 is provided as an example. Other examples may differ from what is described with regard to FIG. 4.

Figure 5:
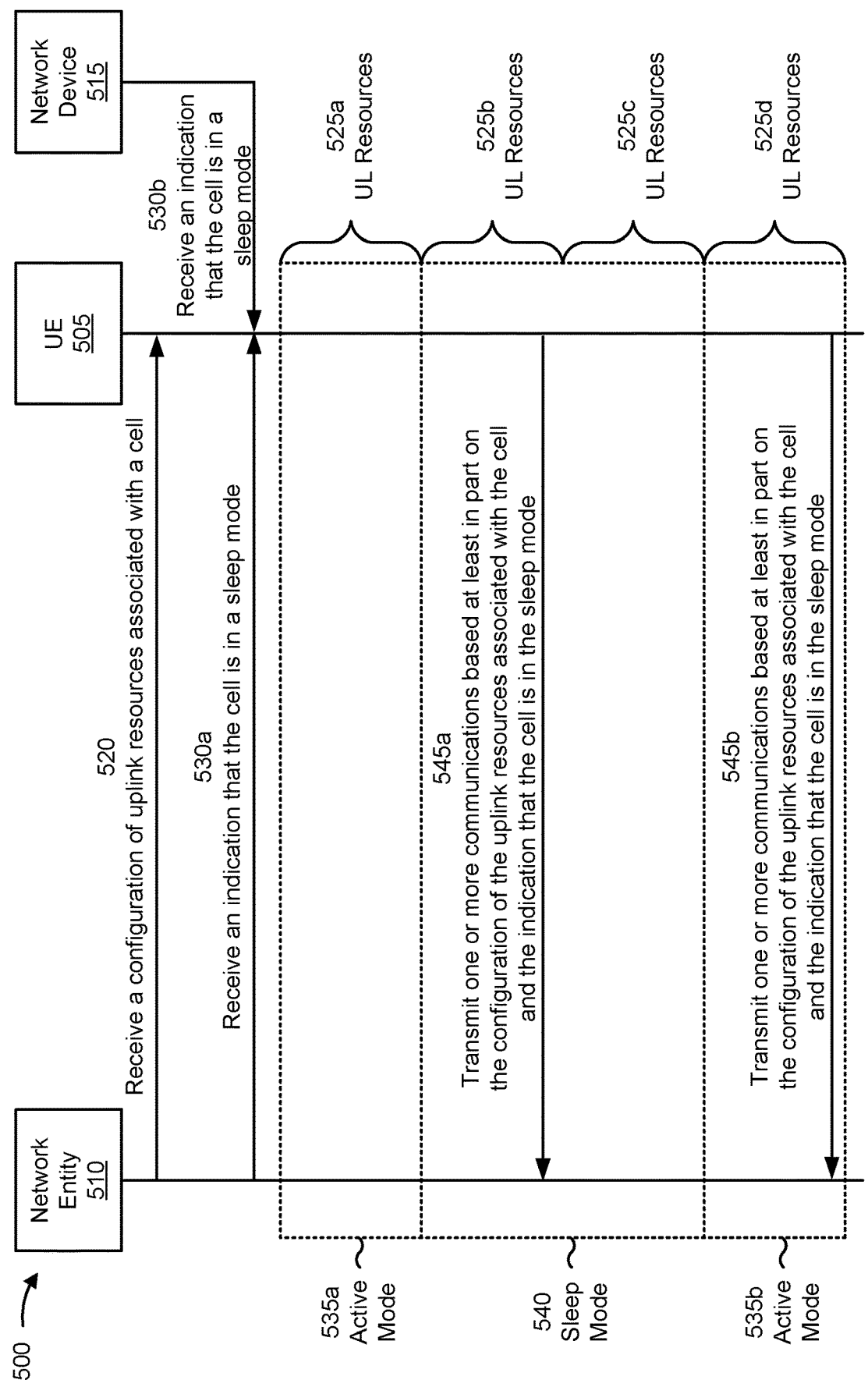
FIG. 5 is a diagram illustrating an example associated with an uplink transmission during a cell sleep mode operation, in accordance with the present disclosure.

FIG. 5 is a diagram illustrating an example 500 associated with an uplink transmission during a cell sleep mode operation, in accordance with the present disclosure. As shown in FIG. 5, a UE 505 (e.g., UE 120) and a network entity 510 (e.g., network entity 405) may communicate with one another. Moreover, the UE 505 and/or the network entity 510 may communicate with one or more other network devices. For example, in the depicted example, the UE 505 may communicate with a network device 515, which may be another UE (e.g., UE 120) or another network entity (e.g., a base station 110, a CU 310, a DU 330, an RU 340, or the like), or similar network device. In some aspects, the UE 505, the network entity 510, and/or the network device 515 may be part of a wireless network (e.g., wireless network 100). The UE 505, the network entity 510, and/or the network device 515 may have established a wireless connection prior to operations shown in FIG. 5.

As shown by reference number 520, the UE 505 may receive, from the network entity 510, configuration information. In some aspects, the UE 505 may receive the configuration information via one or more of RRC signaling, one or more MAC control elements (MAC-CEs), and/or downlink control information (DCI), among other examples. In some aspects, the configuration information may include an indication of one or more configuration parameters (e.g., already known to the UE 505 and/or previously indicated by the network entity 510 or other network device) for selection by the UE 505, and/or explicit configuration information for the UE 505 to use to configure the UE 505, among other examples.

In some aspects, the configuration information may indicate a configuration of uplink resources associated with a cell. For example, the network entity 510 may be associated with a cell (such as a macro cell 102a, a pico cell 102b, a femto cell 102c, or the like), and the configuration may indicate periodic resources to be used for uplink transmissions associated with the cell. As shown in FIG. 5, four sets of uplink resources may be configured, including uplink resources 525a, uplink resources 525b, uplink resources 525c, and uplink resources 525d. In some other aspects, more or less uplink resources may be configured without departing from the scope of the disclosure. In some aspects, the uplink resources 525a, 525b, 525c, and 525d may correspond to one or more of the WUS occasions 445a or 445b, PRACH occasions 450a or 450b, SR occasions 455a or 455b, or CG occasion 460 described in connection with FIG. 4. In that regard, the uplink resources 525a, 525b, 525c, and 525d may be periodically occurring resources for use by the UE 505 for purposes of transmitting an uplink communication, such as a WUS (e.g., C-WUS), a PRACH communication, an SR communication, a data communication, or the like. The UE 505 may configure itself based at least in part on the configuration information. In some aspects, the UE 505 may be configured to perform one or more operations described herein based at least in part on the configuration information.

As shown by reference numbers 530a and 530b, the UE 505 may receive, from the network entity 510 and/or the other network device 515, respectively, an indication that the cell is in a sleep mode. For example, in some aspects, the network entity 510 may transmit an indication (as shown by reference number 530a) that the cell is in a sleep mode. In some aspects, the indication shown by reference number 530a may indicate a scheduled pattern or the like, indicating when the cell will be in the active mode and when the cell will be in the sleep mode. More particularly, in the example shown in FIG. 5, the cell may be in the active mode during the periods indicated by reference numbers 535a and 535b, and may be in the sleep mode during the period indicated by reference number 540. In some aspects, the network entity 510 may indicate that the cell associated with the network entity 510 is entering the sleep mode and may only be in an active mode during WUS occasions or the like, as described in connection with FIG. 4.

In some other aspects, the indication that the cell is in the sleep mode may be received from the other network device 515 (as shown by reference number 530b). The other network device 515 may be another network entity associated with the cell (e.g., an SCell, a TRP, or the like), and/or may be a base station or similar network entity that schedules active time and/or sleep time for the network entity 510 for the sleep mode and notifies nearby UEs of the same. In some aspects, the network device 515 may be capable of sensing or otherwise determining that the cell has entered into a sleep mode, and the network device 515 may notify nearby UEs and/or other network devices that the cell has entered the sleep mode, accordingly.

In some aspects, at least a subset of the uplink resources configured by the configuration shown at reference number 520 may occur when the cell is in the sleep mode. For example, in the depicted aspect, the configuration configured four uplink resources 525a-525d, with two of the uplink resources, uplink resources 525b and 525c, occurring when the cell is in the sleep mode (as indicated by reference number 540). These uplink resources 525b and 525c may correspond to one or more of the PRACH occasion 450a or 450b, the SR occasions 455a or 455b, or the CG occasion 460 described in FIG. 4. Additionally, another subset of the uplink resources configured by the configuration shown at reference number 520 may occur when the cell is in the active mode. For example, the uplink resources 525a and 525d occur when the cell is in the active mode, as shown by reference numbers 535a and 535b, respectively. In some aspects, the uplink resources 525a and 525d that occur when the cell is in the active mode may correspond to the WUS occasions 445a and 445b described in connection with FIG. 4. In such aspects, the cell may enter the active mode shown by reference numbers 535a and 535b during the WUS occasions 445a and 445b in order to monitor for a WUS 440, as described.

As shown by reference numbers 545a and 545b, the UE 505 may transmit, to the network entity 510, one or more communications based at least in part on the configuration of the uplink resources associated with the cell and the indication that the cell is in the sleep mode. In some aspects, the UE 505 may be hard-coded and/or configured such that the UE 505 is permitted to transmit certain communications using the subset of the uplink resources that occur when the cell is in the sleep mode, and thus the UE 505 may transmit the communications using uplink resources that occur during the sleep mode (e.g., uplink resources 525b), as shown by reference number 545a. However, in some other aspects, the UE 505 may not be permitted to transmit certain communications using the subset of the uplink resources that occur when the cell is in the sleep mode, and thus the UE 505 may only transmit the communications using uplink resources that occur during the active mode (e.g., uplink resources 525d), as shown by reference number 545b. For example, when in the sleep mode, the cell may be associated with a reduced number of antenna ports (e.g., 0-8 antenna ports), and thus may be configured to receive no transmissions or else a reduced number of transmissions. Accordingly, the UE 505 may be hard-coded and/or configured to transmit or not transmit a certain communication based at least in part on an uplink resource type, a type of communication to be sent in the uplink resource, whether the cell is in the active mode or the sleep mode, or the like, in light of the reduced reception capability of the network entity 510 during the sleep mode.

More particularly, in some aspects, the UE 505 may not be permitted to transmit any uplink communications when the cell is in the sleep mode or may not be permitted to transmit certain uplink communications when the cell is in the sleep mode, such as low-priority communications, data communications, or the like. In such aspects, the UE 505 may transmit the one or more communications using uplink resources which occur during the active mode (e.g., uplink resources 525d), as shown by reference number 545b, but may not be permitted to transmit the one or more communications during the sleep mode shown at reference number 540. Put another way, in some aspects, the UE 505 is not permitted to transmit the one or more communications using the subset of the uplink resources that occur when the cell is in the sleep mode. In some other aspects, however, the UE 505 may be permitted to transmit certain uplink communications when the cell is in the sleep mode, such as high-priority communications or the like. In such aspects, the UE 505 may transmit the one or more communications using the uplink resources which occur during the sleep mode (e.g., uplink resources 525b), as shown by reference number 545a, in addition to or instead of the uplink resources that occur during the active mode. Put another way, in some aspects, the UE 505 is permitted to transmit the one or more communications using the subset of the uplink resources that occur when the cell is in the sleep mode.

In some aspects, the UE may be permitted to transmit a subset of the one or more communications using the subset of the uplink resources that occur when the cell is in the sleep mode. For example, the UE 505 may be permitted to transmit only certain types of communications during the sleep mode, but may be permitted to transmit more types of communications during the active mode. In some aspects, the subset of the one or more communications that the UE 505 may be permitted to transmit during the sleep mode may include at least one of a communication associated with an RRC re-establishment procedure, a communication associated with an SR failure, or a communication associated with a beam failure recovery procedure. These communications may be deemed to have a high enough priority that the UE 505 is permitted to transmit the communications, even when the network entity 510 is in the sleep mode. Put another way, the network entity 510's reduced antenna ports and/or resources during the sleep mode may be reserved for these high-priority types of communications. In such aspects, the UE 505 may use a PRACH occasion (e.g., the PRACH occasion 450a or the PRACH occasion 450b) or the like that occurs during the sleep mode for transmitting one or more of the communication associated with an RRC re-establishment procedure, the communication associated with an SR failure, or the communication associated with a beam failure recovery procedure.

In some aspects, the UE 505 may receive, from the network entity 510, a configuration indicating whether the UE 505 is permitted to transmit the one or more communications using the subset of the uplink resources that occur during the sleep mode. For example, the UE 505 may receive a configuration indicating that the UE 505 UE is permitted to transmit a PRACH communication using the subset of the uplink resources that occur during the sleep mode, but that the UE 505 is not permitted other types of communications during using the subset of the uplink resources that occur during the sleep mode. As described in connection with FIG. 4, a PRACH communication may be associated with: initial access after UE power up; transition from an RRC idle/active to an RRC connected state; RRC connection re-establishment after radio link failure; handover procedures; synchronization procedures (e.g., when uplink or downlink data arrives in RRC_CONNECTED with non-synchronized uplink); uplink data arrival in RRC-_CONNECTED with no PUCCH resources allocated for a SR; SR Failure (e.g., when uplink data is available, but no uplink grant is given in response to a SR); on-demand system information; beam failure recovery; or establishing time alignment when adding an SCell (which may be triggered by a PDCCH order). In some aspects, the UE 505 may receive the configuration indicating whether the UE 505 is permitted to transmit the one or more communications using the subset of the uplink resources that occur during the sleep mode as part of the configuration described in connection with reference number 520, while, in some other aspects, the UE 505 may receive the configuration indicating whether the UE 505 is permitted to transmit the one or more communications using the subset of the uplink resources that occur during the sleep mode via a different configuration message. In some aspects, the UE 505 may receive a configuration indicating whether the UE 505 is permitted to transmit the one or more communications using the subset of the uplink resources that occur during the sleep mode via RRC signaling, MAC-CE signaling, DCI signaling, or the like.

In some aspects, the UE 505 may be permitted to transmit high-priority communications (e.g., communications associated with a certain priority level) using the using the subset of the uplink resources that occur during the sleep mode. For example, communications to be transmitted by the UE 505 may be associated with a priority value, and the UE 505 may be permitted to transmit one or more communications using the subset of the uplink resources that occur during the sleep mode based at least in part on a corresponding priority value being greater than a threshold priority value. In some aspects, the priority value may be associated with a service type and/or a use case, such as whether the uplink communication is associated with one of an enhanced mobile broadband (eMBB) use case, an ultra reliable and low latency communications (URLLC) use case, a massive machine type communications (mMTC) use case, or the like. For example, communications associated with one or more use cases (e.g., one or more of an eMBB, URLLC, or mMTC use case) may correspond to a priority value that exceeds the threshold priority value and thus are permitted to be transmitted using the subset of the uplink resources that occur during the sleep mode, while communications associated with the other use cases may correspond to a priority value that does not exceed the threshold priority value and thus the communications are not permitted to be transmitted using the subset of the uplink resources that occur during the sleep mode.

In some aspects, one or more of the uplink resources 525a, 525b, 525c, or 525d may be associated with a scheduling grant that is received by the UE 505, from the network entity 510, when the cell is in an active mode, but that schedules certain resources for uplink transmission outside of the cell active time, when the cell is in the sleep mode. For example, in some aspects, the configuration described in connection with reference number 520 may be associated with a scheduling grant received while the cell is in an active mode, and the configuration may schedule the uplink resources 525a, 525b, 525c, and 525d for a data transmission or the like, which include resources that occur during the active mode (e.g., uplink resources 525a and 525d) as well as resources that occur during the sleep mode (e.g., uplink resources 525b and 525c). In some aspects, if the UE 505 receives a scheduling grant inside cell active time with resources for uplink transmission during the sleep mode (e.g., uplink resources 525b and 525c), the UE 505 may be permitted to transmit the data transmission or the like in the scheduled resources, notwithstanding that the scheduled resources occur during the sleep mode. Put another way, when the configuration of the uplink resources is received via a scheduling grant when the cell is in an active mode that schedules the subset of the uplink resources that occur during the sleep mode and another subset of the uplink resources that occur when the cell is in the active mode, the UE 505 may be permitted to transmit the one or more communications using the subset of the uplink resources that occur during the sleep mode and the other subset of the uplink resources that occur during the active mode (e.g., using the uplink resources 525a, 525b, 525c, and 525d).

In some other aspects, however, the UE 505 may only be permitted to transmit the data transmission or the like in the scheduled resources that occur during the active mode. Put another way, when the configuration of the uplink resources is received via a scheduling grant when the cell is in an active mode that schedules the subset of the uplink resources that occur during the sleep mode and another subset of the uplink resources that occur when the cell is in the active mode, the UE 505 may not be permitted to transmit the one or more communications using the subset of the uplink resources that occur during the sleep mode (e.g., uplink resources 525b and 525c), but the UE 505 may be permitted to transmit the one or more communications using the other subset of the uplink resources that occur during the active mode (e.g., uplink resources 525a and 525d).

In some aspects, one or more of the uplink resources 525a, 525b, 525c, or 525d may be associated with a CG PUSCH that is received by the UE 505, from the network entity 510, scheduling resources for uplink transmission outside of the active mode (e.g., when the cell is in the sleep mode). For example, in some aspects, the configuration described in connection with reference number 520 may be associated with a CG PUSCH that may schedule multiple CG uplink resources (e.g., uplink resources 525a, 525b, 525c, and 525d), which, in this example, may be uplink slots associated with a CG occasion for a data transmission or the like (e.g., CG occasion 460). In such aspects, the CG occasion may include slots that occur during the active mode (e.g., uplink resources 525a and 525d) as well as slots that occur during the sleep mode (e.g., uplink resources 525b and 525c). That is, the configuration of the uplink resources may include a configuration of CG uplink resources, with a first CG uplink resource occurring when the cell is in the sleep mode (e.g., one of the uplink resources 525b or 525c), and with a second CG uplink resource occurring when the cell is in an active mode (e.g., one of the uplink resources 525a or 525d).

In such aspects, the configuration of the CG PUSCH may indicate that the uplink grant should continue for a configured number of CG occurrences (sometimes referred to as CG PUSCH repetitions), and the UE 505 may or may not count the CG uplink resources as a CG occurrence (e.g., may or may not count the CG uplink resources as a CG occurrence or a CG PUSCH repetitions) based at least in part on whether the CG uplink resources occur during the sleep mode or the active mode. For example, in some aspects, if the UE 505 is configured with a CG PUSCH, and an uplink data packet arrives when the cell is in the sleep mode (such as during one of the uplink resources 525b or 525c), the CG occurrences occurring during the sleep mode are not counted as CG PUSCH repetitions, and, instead, the first available slot for transmission occurring during the active mode (e.g., the uplink resource 525d) may be counted as the first CG PUSCH repetition. Put another way, when a first CG uplink resource occurs when the cell is in the sleep mode and a second CG uplink resource occurs when the cell is in an active mode, the first CG uplink resource may not be counted as a CG occurrence, and the second CG uplink resource may be counted as a CG occurrence. However, in some other aspects, if the UE 505 is configured with a CG PUSCH, and an uplink data packet arrives when the cell is in the sleep mode (such as during one of the uplink resources 525b or 525c), the CG occurrences occurring during the sleep mode are counted as CG PUSCH repetitions (e.g., the UE 505 counts as a CG PUSCH repetition a first available slot for transmission, whether or not the slot occurs during the active mode). Put another way, when a first CG uplink resource occurs when the cell is in the sleep mode and a second CG uplink resource occurs when the cell is in an active mode, the first CG uplink resource and the second CG uplink resource may both be counted as CG occurrences.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 505) performs operations associated with uplink transmission during a cell sleep mode operation.

As shown in FIG. 6, in some aspects, process 600 may include receiving, from a network entity (e.g., network entity 510), a configuration of uplink resources associated with a cell (block 610). For example, the UE (e.g., using communication manager 808 and/or reception component 802, depicted in FIG. 8) may receive, from a network entity, a configuration of uplink resources associated with a cell, as described above.

As further shown in FIG. 6, in some aspects, process 600 may include receiving an indication that the cell is in a sleep mode, wherein at least a subset of the uplink resources occurs when the cell is in the sleep mode (block 620). For example, the UE (e.g., using communication manager 808 and/or reception component 802, depicted in FIG. 8) may receive an indication that the cell is in a sleep mode, wherein at least a subset of the uplink resources occurs when the cell is in the sleep mode, as described above.

As further shown in FIG. 6, in some aspects, process 600 may include transmitting one or more communications based at least in part on the configuration of the uplink resources associated with the cell and the indication that the cell is in the sleep mode (block 630). For example, the UE (e.g., using communication manager 808 and/or transmission component 804, depicted in FIG. 8) may transmit one or more communications based at least in part on the configuration of the uplink resources associated with the cell and the indication that the cell is in the sleep mode, as described above.

Process 600 may include additional aspects, such as any single aspect or any combination of aspects described below and/or in connection with one or more other processes described elsewhere herein.

In a first aspect, the UE is not permitted to transmit the one or more communications using the subset of the uplink resources.

In a second aspect, alone or in combination with the first aspect, the UE is permitted to transmit the one or more communications using the subset of the uplink resources.

In a third aspect, alone or in combination with one or more of the first and second aspects, the UE is permitted to transmit a subset of the one or more communications using the subset of the uplink resources.

In a fourth aspect, alone or in combination with one or more of the first through third aspects, the subset of the one or more communications include at least one of a communication associated with an RRC re-establishment procedure, a communication associated with a scheduling request failure, or a communication associated with a beam failure recovery procedure.

In a fifth aspect, alone or in combination with one or more of the first through fourth aspects, process 600 includes receiving, from the network entity, a configuration indicating whether the UE is permitted to transmit the one or more communications using the subset of the uplink resources.

In a sixth aspect, alone or in combination with one or more of the first through fifth aspects, the configuration indicating whether the UE is permitted to transmit the one or more communications using the subset of the uplink resources indicates that the UE is permitted to transmit a PRACH communication using the subset of the uplink resources.

In a seventh aspect, alone or in combination with one or more of the first through sixth aspects, the one or more communications are associated with a priority value, and the UE is permitted to transmit the one or more communications using the subset of the uplink resources based at least in part on the priority value being greater than a threshold priority value.

In an eighth aspect, alone or in combination with one or more of the first through seventh aspects, the configuration of the uplink resources is received via a scheduling grant when the cell is in an active mode, and another subset of the uplink resources occurs when the cell is in the active mode.

In a ninth aspect, alone or in combination with one or more of the first through eighth aspects, the UE is permitted to transmit the one or more communications using the subset of the uplink resources and the other subset of the uplink resources.

In a tenth aspect, alone or in combination with one or more of the first through ninth aspects, the UE is not permitted to transmit the one or more communications using the subset of the uplink resources, and the UE is permitted to transmit the one or more communications using the other subset of the uplink resources.

In an eleventh aspect, alone or in combination with one or more of the first through tenth aspects, the configuration of the uplink resources includes a configuration of configured grant uplink resources, a first configured grant uplink resource occurs when the cell is in the sleep mode, and a second configured grant uplink resource occurs when the cell is in an active mode.

In a twelfth aspect, alone or in combination with one or more of the first through eleventh aspects, the first configured grant uplink resource is not counted as a configured grant occurrence, and the second configured grant uplink resource is counted as a configured grant occurrence.

In a thirteenth aspect, alone or in combination with one or more of the first through twelfth aspects, the first configured grant uplink resource and the second configured grant uplink resource are counted as configured grant occurrences.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network entity, in accordance with the present disclosure. Example process 700 is an example where the network entity (e.g., network entity 510) performs operations associated with uplink transmission during a cell sleep mode operation.

As shown in FIG. 7, in some aspects, process 700 may include transmitting, to a UE (e.g., UE 505), a configuration of uplink resources associated with a cell (block 710). For example, the network entity (e.g., using communication manager 908 and/or transmission component 904, depicted in FIG. 9) may transmit, to a UE, a configuration of uplink resources associated with a cell, as described above.

As further shown in FIG. 7, in some aspects, process 700 may include transmitting, to the UE, an indication that the cell is in a sleep mode, wherein at least a subset of the uplink resources occurs when the cell is in the sleep mode (block 720). For example, the network entity (e.g., using communication manager 908 and/or transmission component 904, depicted in FIG. 9) may transmit, to the UE, an indication that the cell is in a sleep mode, wherein at least a subset of the uplink resources occurs when the cell is in the sleep mode, as described above.

As further shown in FIG. 7, in some aspects, process 700 may include receiving, from the UE, one or more communications based at least in part on the configuration of the uplink resources associated with the cell and the indication that the cell is in the sleep mode (block 730). For example, the network entity (e.g., using communication manager 908 and/or reception component 902, depicted in FIG. 9) may receive, from the UE, one or more communications based at least in part on the configuration of the uplink resources associated with the cell and the indication that the cell is in the sleep mode, as described above.

Process 700 may include additional aspects, such as any single aspect or any combination of aspects described below and/or in connection with one or more other processes described elsewhere herein.

In a first aspect, the UE is not permitted to transmit the one or more communications using the subset of the uplink resources.

In a second aspect, alone or in combination with the first aspect, the UE is permitted to transmit the one or more communications using the subset of the uplink resources.

In a third aspect, alone or in combination with one or more of the first and second aspects, the UE is permitted to transmit a subset of the one or more communications using the subset of the uplink resources.

In a fourth aspect, alone or in combination with one or more of the first through third aspects, the subset of the one or more communications include at least one of a communication associated with an RRC re-establishment procedure, a communication associated with a scheduling request failure, or a communication associated with a beam failure recovery procedure.

In a fifth aspect, alone or in combination with one or more of the first through fourth aspects, process 700 includes transmitting, to the UE, a configuration indicating whether the UE is permitted to transmit the one or more communications using the subset of the uplink resources.

In a sixth aspect, alone or in combination with one or more of the first through fifth aspects, the configuration indicating whether the UE is permitted to transmit the one or more communications using the subset of the uplink resources indicates that the UE is permitted to transmit a PRACH communication using the subset of the uplink resources.

In a seventh aspect, alone or in combination with one or more of the first through sixth aspects, the one or more communications are associated with a priority value, and the UE is permitted to transmit the one or more communications using the subset of the uplink resources based at least in part on the priority value being greater than a threshold priority value.

In an eighth aspect, alone or in combination with one or more of the first through seventh aspects, the configuration of the uplink resources is transmitted via a scheduling grant when the cell is in an active mode, and another subset of the uplink resources occurs when the cell is in the active mode.

In a ninth aspect, alone or in combination with one or more of the first through eighth aspects, the UE is permitted to transmit the one or more communications using the subset of the uplink resources and the other subset of the uplink resources.

In a tenth aspect, alone or in combination with one or more of the first through ninth aspects, the UE is not permitted to transmit the one or more communications using the subset of the uplink resources, and the UE is permitted to transmit the one or more communications using the other subset of the uplink resources.

In an eleventh aspect, alone or in combination with one or more of the first through tenth aspects, the configuration of the uplink resources includes a configuration of configured grant uplink resources, a first configured grant uplink resource occurs when the cell is in the sleep mode, and a second configured grant uplink resource occurs when the cell is in an active mode.

In a twelfth aspect, alone or in combination with one or more of the first through eleventh aspects, the first configured grant uplink resource is not counted as a configured grant occurrence, and the second configured grant uplink resource is counted as a configured grant occurrence.

In a thirteenth aspect, alone or in combination with one or more of the first through twelfth aspects, the first configured grant uplink resource and the second configured grant uplink resource are counted as configured grant occurrences.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
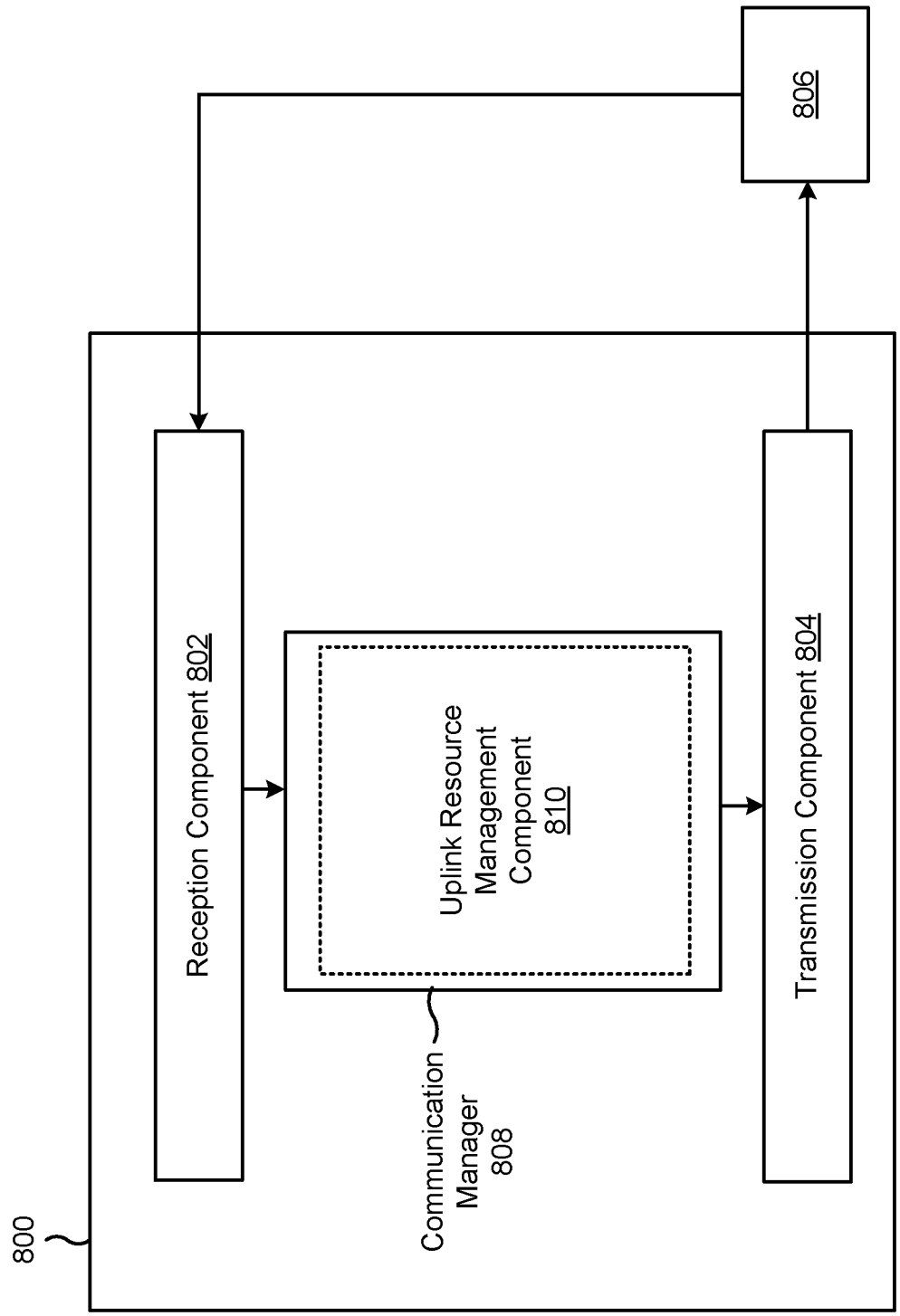
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE (e.g., UE 505), or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 808 (e.g., communication manager 140). The communication manager 808 may include an uplink resource management component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE 120 described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE 120 described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE 120 described in connection with FIG. 2. In some aspects, the transmission component 804 may be co-located with the reception component 802 in a transceiver.

The reception component 802 and/or the uplink resource management component 810 may receive, from a network entity, a configuration of uplink resources associated with a cell. The reception component 802 and/or the uplink resource management component 810 may receive an indication that the cell is in a sleep mode, wherein at least a subset of the uplink resources occurs when the cell is in the sleep mode. The transmission component 804 and/or the uplink resource management component 810 may transmit one or more communications based at least in part on the configuration of the uplink resources associated with the cell and the indication that the cell is in the sleep mode.

The reception component 802 and/or the uplink resource management component 810 may receive, from the network entity, a configuration indicating whether the UE is permitted to transmit the one or more communications using the subset of the uplink resources.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
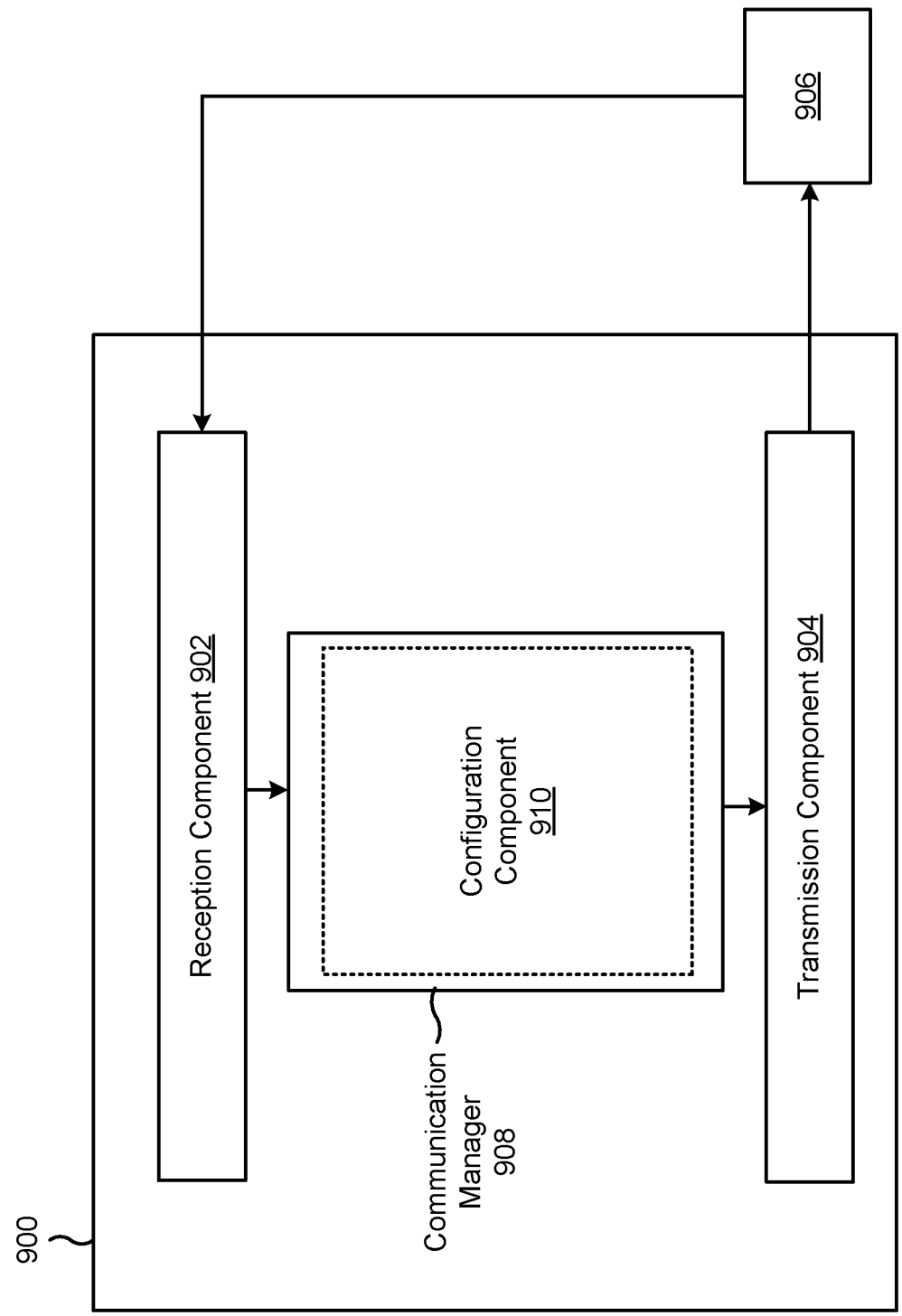
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network entity (e.g., network entity 510), or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908 (e.g., communication manager 150). The communication manager 908 may include a configuration component 910, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station 110 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station 110 described in connection with FIG. 2. In some aspects, the transmission component 904 may be co-located with the reception component 902 in a transceiver.

The transmission component 904 and/or the configuration component 910 may transmit, to a UE (e.g., UE 505), a configuration of uplink resources associated with a cell. The transmission component 904 may transmit, to the UE, an indication that the cell is in a sleep mode, wherein at least a subset of the uplink resources occurs when the cell is in the sleep mode. The reception component 902 may receive, from the UE, one or more communications based at least in part on the configuration of the uplink resources associated with the cell and the indication that the cell is in the sleep mode.

The transmission component 904 and/or the configuration component 910 may transmit, to the UE, a configuration indicating whether the UE is permitted to transmit the one or more communications using the subset of the uplink resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a network entity, a configuration of uplink resources associated with a cell; receiving an indication that the cell is in a sleep mode, wherein at least a subset of the uplink resources occurs when the cell is in the sleep mode; and transmitting one or more communications based at least in part on the configuration of the uplink resources associated with the cell and the indication that the cell is in the sleep mode.

Aspect 2: The method of Aspect 1, wherein the UE is not permitted to transmit the one or more communications using the subset of the uplink resources.

Aspect 3: The method of Aspect 1, wherein the UE is permitted to transmit the one or more communications using the subset of the uplink resources.

Aspect 4: The method of Aspect 1, wherein the UE is permitted to transmit a subset of the one or more communications using the subset of the uplink resources.

Aspect 5: The method of Aspect 4, wherein the subset of the one or more communications include at least one of a communication associated with an RRC re-establishment procedure, a communication associated with a scheduling request failure, or a communication associated with a beam failure recovery procedure.

Aspect 6: The method of any of Aspects 1-5, further comprising receiving, from the network entity, a configuration indicating whether the UE is permitted to transmit the one or more communications using the subset of the uplink resources.

Aspect 7: The method of Aspect 6, wherein the configuration indicating whether the UE is permitted to transmit the one or more communications using the subset of the uplink resources indicates that the UE is permitted to transmit a PRACH communication using the subset of the uplink resources.

Aspect 8: The method of any of Aspects 1-7, wherein the one or more communications are associated with a priority value, and wherein the UE is permitted to transmit the one or more communications using the subset of the uplink resources based at least in part on the priority value being greater than a threshold priority value.

Aspect 9: The method of any of Aspects 1-8, wherein the configuration of the uplink resources is received via a scheduling grant when the cell is in an active mode, and wherein another subset of the uplink resources occurs when the cell is in the active mode.

Aspect 10: The method of Aspect 9, wherein the UE is permitted to transmit the one or more communications using the subset of the uplink resources and the other subset of the uplink resources.

Aspect 11: The method of Aspect 9, wherein the UE is not permitted to transmit the one or more communications using the subset of the uplink resources, and wherein the UE is permitted to transmit the one or more communications using the other subset of the uplink resources.

Aspect 12: The method of any of Aspects 1-11, wherein the configuration of the uplink resources includes a configuration of configured grant uplink resources, wherein a first configured grant uplink resource occurs when the cell is in the sleep mode, and wherein a second configured grant uplink resource occurs when the cell is in an active mode.

Aspect 13: The method of Aspect 12, wherein the first configured grant uplink resource is not counted as a configured grant occurrence, and wherein the second configured grant uplink resource is counted as a configured grant occurrence.

Aspect 14: The method of Aspect 12, wherein the first configured grant uplink resource and the second configured grant uplink resource are counted as configured grant occurrences.

Aspect 15: A method of wireless communication performed by a network entity, comprising: transmitting, to a UE, a configuration of uplink resources associated with a cell; transmitting, to the UE, an indication that the cell is in a sleep mode, wherein at least a subset of the uplink resources occurs when the cell is in the sleep mode; and receiving, from the UE, one or more communications based at least in part on the configuration of the uplink resources associated with the cell and the indication that the cell is in the sleep mode.

Aspect 16: The method of Aspect 15, wherein the UE is not permitted to transmit the one or more communications using the subset of the uplink resources.

Aspect 17: The method of Aspect 15, wherein the UE is permitted to transmit the one or more communications using the subset of the uplink resources.

Aspect 18: The method of Aspect 15, wherein the UE is permitted to transmit a subset of the one or more communications using the subset of the uplink resources.

Aspect 19: The method of Aspect 18, wherein the subset of the one or more communications include at least one of a communication associated with an RRC re-establishment procedure, a communication associated with a scheduling request failure, or a communication associated with a beam failure recovery procedure.

Aspect 20: The method of any of Aspects 15-19, further comprising transmitting, to the UE, a configuration indicating whether the UE is permitted to transmit the one or more communications using the subset of the uplink resources.

Aspect 21: The method of Aspect 20, wherein the configuration indicating whether the UE is permitted to transmit the one or more communications using the subset of the uplink resources indicates that the UE is permitted to transmit a PRACH communication using the subset of the uplink resources.

Aspect 22: The method of any of Aspects 15-21, wherein the one or more communications are associated with a priority value, and wherein the UE is permitted to transmit the one or more communications using the subset of the uplink resources based at least in part on the priority value being greater than a threshold priority value.

Aspect 23: The method of any of Aspects 15-22, wherein the configuration of the uplink resources is transmitted via a scheduling grant when the cell is in an active mode, and wherein another subset of the uplink resources occurs when the cell is in the active mode.

Aspect 24: The method of Aspect 23, wherein the UE is permitted to transmit the one or more communications using the subset of the uplink resources and the other subset of the uplink resources.

Aspect 25: The method of Aspect 23, wherein the UE is not permitted to transmit the one or more communications using the subset of the uplink resources, and wherein the UE is permitted to transmit the one or more communications using the other subset of the uplink resources.

Aspect 26: The method of any of Aspects 15-25, wherein the configuration of the uplink resources includes a configuration of configured grant uplink resources, wherein a first configured grant uplink resource occurs when the cell is in the sleep mode, and wherein a second configured grant uplink resource occurs when the cell is in an active mode.

Aspect 27: The method of Aspect 26, wherein the first configured grant uplink resource is not counted as a configured grant occurrence, and wherein the second configured grant uplink resource is counted as a configured grant occurrence.

Aspect 28: The method of Aspect 26, wherein the first configured grant uplink resource and the second configured grant uplink resource are counted as configured grant occurrences.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
a transceiver;
memory comprising instructions; and
one or more processors configured to execute the instructions to cause the UE to:
receive, via the transceiver, a configuration of uplink resources associated with a cell, wherein the configuration is received via a scheduling grant when the cell is in an active mode and a first subset of the uplink resources occurs when the cell is in the active mode;
receive, via the transceiver, an indication that the cell is in a sleep mode, wherein a second subset of the uplink resources occurs when the cell is in the sleep mode; and
transmit, via the transceiver, one or more communications based at least in part on the configuration of the uplink resources associated with the cell and the indication that the cell is in the sleep mode.

2. The UE of claim 1, wherein the UE is not permitted to transmit the one or more communications using the second subset of the uplink resources.

3. The UE of claim 1, wherein the UE is permitted to transmit the one or more communications using the second subset of the uplink resources.

4. The UE of claim 1, wherein the UE is permitted to transmit a subset of the one or more communications using the second subset of the uplink resources.

5. The UE of claim 4, wherein the subset of the one or more communications include at least one of a communication associated with a radio resource control (RRC) re-establishment procedure, a communication associated with a scheduling request failure, or a communication associated with a beam failure recovery procedure.

6. The UE of claim 1, wherein the one or more processors are further configured to cause the UE to receive, via the transceiver, a configuration indicating whether the UE is permitted to transmit the one or more communications using the second subset of the uplink resources.

7. The UE of claim 6, wherein the configuration indicating whether the UE is permitted to transmit the one or more communications using the second subset of the uplink resources indicates that the UE is permitted to transmit a physical random access channel (PRACH) communication using the second subset of the uplink resources.

8. The UE of claim 1, wherein the one or more communications are associated with a priority value, and wherein the UE is permitted to transmit the one or more communications using the second subset of the uplink resources based at least in part on the priority value being greater than a threshold priority value.

9. The UE of claim 1, wherein the UE is permitted to transmit the one or more communications using the first subset of the uplink resources and the second subset of the uplink resources.

10. The UE of claim 1, wherein the UE is not permitted to transmit the one or more communications using the second subset of the uplink resources, and wherein the UE is permitted to transmit the one or more communications using the first subset of the uplink resources.

11. The UE of claim 1, wherein the configuration of the uplink resources includes a configuration of configured grant uplink resources, wherein a first configured grant uplink resource occurs when the cell is in the sleep mode, and wherein a second configured grant uplink resource occurs when the cell is in an active mode.

12. The UE of claim 11, wherein the first configured grant uplink resource is not counted as a configured grant occurrence, and wherein the second configured grant uplink resource is counted as a configured grant occurrence.

13. The UE of claim 11, wherein the first configured grant uplink resource and the second configured grant uplink resource are counted as configured grant occurrences.

14. A network entity, comprising:
a transceiver;
memory comprising instructions; and
one or more processors configured to execute the instructions to cause the network entity to:
transmit, via the transceiver and to a user equipment (UE), a configuration of uplink resources associated with a cell, wherein the configuration of the uplink resources is transmitted via a scheduling grant when the cell is in an active mode and a first subset of the uplink resources occurs when the cell is in the active mode;
transmit, via the transceiver and to the UE, an indication that the cell is in a sleep mode, wherein a second subset of the uplink resources occurs when the cell is in the sleep mode; and
receive, via the transceiver and from the UE, one or more communications based at least in part on the configuration of the uplink resources associated with the cell and the indication that the cell is in the sleep mode.

15. The network entity of claim 14, wherein the UE is not permitted to transmit the one or more communications using the second subset of the uplink resources.

16. The network entity of claim 14, wherein the UE is permitted to transmit the one or more communications using the second subset of the uplink resources.

17. The network entity of claim 14, wherein the UE is permitted to transmit a subset of the one or more communications using the second subset of the uplink resources.

18. The network entity of claim 14, wherein the one or more processors are further configured to transmit, via the transceiver and to the UE, a configuration indicating whether the UE is permitted to transmit the one or more communications using the second subset of the uplink resources.

19. The network entity of claim 14, wherein the one or more communications are associated with a priority value, and wherein the UE is permitted to transmit the one or more communications using the second subset of the uplink resources based at least in part on the priority value being greater than a threshold priority value.

20. The network entity of claim 14, wherein the UE is permitted to transmit the one or more communications using the first subset of the uplink resources and the second subset of the uplink resources.

21. The network entity of claim 14, wherein the UE is not permitted to transmit the one or more communications using the second subset of the uplink resources, and wherein the UE is permitted to transmit the one or more communications using the first subset of the uplink resources.

22. The network entity of claim 14, wherein the configuration of the uplink resources includes a configuration of configured grant uplink resources, wherein a first configured grant uplink resource occurs when the cell is in the sleep mode, and wherein a second configured grant uplink resource occurs when the cell is in an active mode.

23. The network entity of claim 22, wherein the first configured grant uplink resource is not counted as a configured grant occurrence, and wherein the second configured grant uplink resource is counted as a configured grant occurrence.

24. The network entity of claim 22, wherein the first configured grant uplink resource and the second configured grant uplink resource are counted as configured grant occurrences.

25. A user equipment (UE), comprising:
a transceiver;
memory comprising instructions; and
one or more processors configured to execute the instructions to cause the UE to:
receive, via the transceiver, a first configuration of uplink resources associated with a cell;
receive, via the transceiver, an indication that the cell is in a sleep mode, wherein at least a subset of the uplink resources occurs when the cell is in the sleep mode;
receive, via the transceiver, a second configuration indicating whether the UE is permitted to transmit the one or more communications using the subset of the uplink resources; and
transmit, via the transceiver, one or more communications after receiving the first configuration, the indication, and second configuration.

26. The UE of claim 25, wherein the second configuration indicates that the UE is permitted to transmit a physical random access channel (PRACH) communication using the subset of the uplink resources.

27. A network entity, comprising:
a transceiver;
memory comprising instructions; and
one or more processors configured to execute the instructions to cause the network entity to:
transmit, via the transceiver and to a user equipment (UE), a first configuration of uplink resources associated with a cell;
transmit, via the transceiver and to the UE, an indication that the cell is in a sleep mode, wherein at least a subset of the uplink resources occurs when the cell is in the sleep mode;
transmit, via the transceiver and to the UE, a second configuration indicating whether the UE is permitted to transmit the one or more communications using the subset of the uplink resources; and
receive, via the transceiver and from the UE, one or more communications after transmitting the first configuration, the indication, and the second configuration.

28. The network entity of claim 27, wherein the second configuration indicates that the UE is permitted to transmit a physical random access channel (PRACH) communication using the subset of the uplink resources.

* * * * *